United States Patent [19]

Nicholl et al.

[11] Patent Number: 5,455,897
[45] Date of Patent: Oct. 3, 1995

[54] POLYGON AND POLYLINE CLIPPING FOR COMPUTER GRAPHIC DISPLAYS

[75] Inventors: Tina Nicholl; Khun Y. Fung, both of London, Canada

[73] Assignee: The University of Western Ontario, London, Canada

[21] Appl. No.: 27,420

[22] Filed: Mar. 8, 1993

[51] Int. Cl.$^6$ .................................................. G06F 15/62
[52] U.S. Cl. ........................ 395/134; 395/133; 395/135; 395/143
[58] Field of Search ........................ 395/133–136, 395/140–143, 155, 157, 158, 161; 345/113, 114, 118–120

[56] References Cited

U.S. PATENT DOCUMENTS 5,040,130  8/1991  Chang et al. ........................ 395/134
5,208,909  5/1993  Corona et al. ........................ 395/134

OTHER PUBLICATIONS

Foley et al. "Computer Graphics Principles & Practice" 1990 pp. 110–125, 923–945.

Primary Examiner—Almis Jankus
Attorney, Agent, or Firm—R. Craig Armstrong

[57] ABSTRACT

A method of clipping polygons in two dimensions, in which if a vertex is outside a boundary line, the succeeding vertex is handled as it is also outside the same boundary line until determined to be otherwise, in which if a vertex is in the window, the succeeding vertex is handled as it is also in the window until determined to be otherwise. This method also produces the fewest vertices after clipping a polygon. A method for clipping polylines is also derived from this method.

8 Claims, 4 Drawing Sheets

POLYGON AND POLYLINE CLIPPING FOR COMPUTER GRAPHIC DISPLAYS

BACKGROUND OF THE INVENTION

1. Field of the Invention

This invention relates to a very efficient process for clipping polygons against a window in computer graphic systems and displays. A modification of the invention clips polylines against a window very efficiently.

2. Description of Prior Art

On a computer graphics output device, such as a video display terminal, a plotter, etc., an area (the window) is always defined either explicitly as a portion or the whole of the display area of the device, or implicitly in which case the whole display area is used, as the area to display a picture. This area may or may not be big enough or oriented such that to contain the whole picture. The actions to be taken to handle the portions of the picture that fall outside the display area, when the window is the whole display area of the output device, are not standardized among output devices. If the window is a sub-area of the display area, the display of the portions of the picture that fall outside the window will intrude possibly other windows and defeat the purpose of specifying a window. The portions of the picture that fall outside the window should be first eliminated before the picture is displayed in the window. This process of eliminating portions of a picture that fall outside the window is called clipping. The process of eliminating portions of a polygon that fall outside a window is called polygon clipping. The process of eliminating portions of a polyline that fall outside a window is called polyline clipping.

The representation of the window, polygons, and other names and labels useful in describing the polygon clipping process are now discussed generally.

The window is defined as the set of points (x, y) such that $$x_{left} \leq x \leq x_{right}$$

$$y_{bottom} \leq y \leq y_{top}$$

where $x=x_{left}$, $x=x_{right}$, $y=y_{bottom}$ and $y=y_{top}$ are the boundary lines of the window (See FIG. 1 (a)). The first two boundary lines are called the vertical boundary lines and the last two are called the horizontal boundary lines. The boundary lines also partition the two dimensional plane into nine regions. The regions delimited by all four boundary lines is the window. The regions delimited by three boundary lines are the edge regions. The regions delimited by two boundary lines are the corner regions. The nine regions are depicted in FIG. 1 (a).

The points $(x_{left}, y_{bottom})$, $(x_{left}, y_{top})$, $(x_{right}, y_{bottom})$ and $(x_{right}, y_{top})$ are called the window corners of the left bottom, left top, right bottom and right top corner regions respectively.

Each boundary line also partitions the two-dimensional plane into two half-planes. One half-plane contains the window and is called the visible side of the boundary line. The other half-plane is called the invisible side of the boundary line (See FIG. 1 (b)). A vertex, an edge, or a group of vertices is outside a boundary line if it is on the invisible side of the boundary line. It is inside a boundary line if it is on the visible side of the boundary line.

A point is said to be visible if it is inside the window. Otherwise, it is invisible.

The input polygon is represented by a sequence of the vertices of the polygon $\langle v_0, v_1, \ldots, v_{n-1} \rangle$. Each vertex is represented by an ordered pair $(x_i, y_i)$, $0 \leq i \leq n-1$ with $x_{n-1}=x_0$ and $y_{n-1}=y_0$. Appending the first vertex to the end of the vertex list will always satisfy this requirement. Each two consecutive vertices represent an edge of the polygon. The edges combine to form the boundary of the polygon. The vertices delimiting an edge are called the endpoints of the edge. An edge is said to be visible if both endpoints of the edge are in the window. An edge is said to be invisible if the whole edge is outside the window. Otherwise, the edge is partly visible or non-invisible.

Suppose the first endpoint $(x_1, y_1)$ is outside two boundary lines. The first endpoint of the clipped edge, if the line segment is partly visible, can be on either of the boundary lines. Suppose the two boundary lines are the top and the left boundary lines. The following inequality is true if the first endpoint of the clipped edge is on the left boundary line.

$$x_1 + \delta x \times \frac{y_{top} - y_1}{\delta y} < x_{left}$$

where $(x_2, y_2)$ is the second endpoint, $\delta x = x_2 - x_1$ and $\delta y = y_2 - y_1$. The equation can be transformed to $$\frac{y_{top} - y_1}{\delta y} < \frac{x_{left} - x_1}{\delta x}$$

if $\delta y$ and $\delta x$ are non-zero. The two quotients are called the quotients of the top and the left boundary lines with respect to the edge, respectively. Quotients are used to compute intersection point.

Given a polygon $\langle v_0, v_1, \ldots, v_{n-1} \rangle$ and a point $P=(x,y)$ that is not on the boundary of the polygon or the window, sum the angles $\angle v_0 P v_1, \angle v_1 P v_2, \ldots, \angle v_{n-2} P v_{n-1}$ in radians. Dividing the sum by $2\pi$ yields a whole number, the wrap number of the point P. The counterclockwise direction is the positive direction, just like in mathematics. A point on the boundary of the window or the polygon has no wrap number.

The result of clipping the polygon $\langle v_0, v_1, \ldots, v_{n-1} \rangle$ against a window is another polygon either empty $\langle \rangle$ when the whole polygon is outside the window, or $\langle v'_0, v'_1, \ldots, v'_{m-1} \rangle$ such that $v'_i$, $0 \leq i \leq m-1$ is either a visible vertex of the original polygon, an intersection point of an edge of the original polygon and the window boundary, or a window corner. The resultant polygon must satisfy the following criteria:

(1) All points in the window but not on the window boundary that have wrap numbers with respect to the original polygon should also have wrap numbers with respect to the resultant polygon. The wrap numbers of these points with respect to the resultant polygon should be identical to the wrap numbers they have with respect to the original polygon. This criterion prevents the modification of the topology of the part of the polygon that is in the window so that the filling process that might be used after the polygon clipping process can be done correctly.

(2) Given a sublist of vertices $l = \langle v_i, v_{i+1}, \ldots, v_j \rangle$ in the polygon such that $v_i$ and $v_j$ are invisible but $v_{i+1}, v_{i+2}, \ldots, v_{j-1}$ are visible, the result of clipping this sublist must be $\langle \Gamma_1, v_{i+1}, v_{i+2}, \ldots, v_{j-1}, \Gamma_2 \rangle$, where $\Gamma_1$ and $\Gamma_2$ are the intersection points the edges $v_i v_{i+1}$ and $v_{j-1} v_j$ make with the window boundary respectively.

(3) Suppose $l' = \langle v_i, \Gamma_1, \omega_1, \omega_2, \ldots, \omega_k, \Gamma_2, v_j \rangle$, a sub-list of vertices of the resultant polygon after clipping $l = \langle v_i, v_{i+1}, \ldots, v_j \rangle$, where $v_{i+1}, v_{i+2}, \ldots, v_{j-1}$ are invisible vertices, none of the edges $v_{i+1} v_{i+2}, v_{i+2} v_{i+3}, \ldots, v_{j-2} v_{j-1}$ intersects the window boundary, $\Gamma_1$ is the intersection point of the edge $v_i v_{i+1}$ and the window boundary, $\Gamma_2$ is the intersection point of the edge $v_{j-1} v_j$ and the window boundary, and $\omega_j$, for all $j$ such that $1 \leq j \leq k$ are window corners included to connect $\Gamma_1$ and $\Gamma_2$.

Take any three consecutive vertices $\mu_1$, $\mu_2$, and $\mu_3$ from $l'$. The edges $\mu_1 \mu_2$, and $\mu_2 \mu_3$ must not intersect each other except at $\mu_2$. This criterion restricts the number of window corners included to connect two intersection points.

The intersection points $\Gamma_1$ and $\Gamma_2$ are called two consecutive intersection points.

(4) If a polygon is entirely outside the window, the resultant polygon should be empty $\langle \rangle$. This criterion prevents the display of extraneous edges when the resultant polygon is empty.

There are two well-known polygon clipping algorithms, the Sutherland-Hodgman and the Liang-Barsky algorithms (See Ivan E. Sutherland and Gary W. Hodgroan, *Reentrant polygon clipping*, Communications of the ACM, volume 17 (1974), no. 1, page 32–42 and You-Dong Liang and Brian A. Barsky, *An analysis and algorithm for polygon clipping*, Communications of the ACM, volume 26 (1983), no. 11, page 868–877). They will be discussed briefly in this section.

The Sutherland-Hodgman Algorithm. The Sutherland-Hodgman algorithm clips the polygon through a pipeline with a different boundary line in each stage of the pipeline. Suppose the boundary lines are ordered in this manner: the left, right, bottom and then the top boundary lines. The algorithm first clips the polygon against the left boundary line. The result of this stage is then fed to be clipped against the right boundary line in the second stage. Similarly, the results of the second, and the third stages are fed to be clipped against the bottom and top boundary lines respectively. The resultant polygon of the fourth stage is the resultant polygon of the clipping process.

In each stage, each of the edges of the input polygon is handled separately into four cases.

(1) Both endpoints are inside the boundary line. The second endpoint is sent to the output.

(2) Both endpoints are outside the boundary line. Both are discarded.

(3) The first endpoint is inside the boundary line and the second endpoint is outside the boundary line. Compute the intersection point the edge makes with the boundary line and output it.

(4) The first endpoint is outside the boundary line and the second endpoint is inside the boundary line. Compute the intersection point the edge makes with the boundary line, output it, and then output the second endpoint.

In this algorithm, a vertex in each stage is processed twice. The first time the vertex is processed as the second endpoint of an edge. The second time it is processed as the first endpoint of the next edge. An edge is processed twice in every stage before it is discarded. A further inefficiency is that some computation of intersection points are ultimately wasted as the intersection points computed are not part of the resultant polygon. This occurs when an intersection point computed in a stage proves to be outside the boundary line in a later stage. The operations used for the computation of the intersection points are all wasted. Furthermore, the last two criteria for resultant polygons are not met by this algorithm. The criterion that a polygon that is outside the window should result in an empty resultant polygon is not met can be shown by a simple example. Refer to FIG. 5 now.

In FIG. 5(a), the original polygon is $\langle$a, b, c, d, e, f, g, h, i, j, k, l, $\rangle$ and the window is labeled as such. Without loss of generality, suppose the arrangement of the boundary lines in the pipeline is the left, the bottom, the right, and the top. FIG. 5(b) shows the resultant polygon of stage one of clipping the original polygon against the left boundary line, $\langle$m, n, o, p, q, r, s, t, u, v, w, x, $\rangle$. This polygon is then fed to the stage to be clipped against the bottom boundary line. The resultant polygon of this second stage is shown in FIG. 5(c), $\langle$y, z, A, B, C, D, E, F, G, H, I, J, $\rangle$, which is then fed to be clipped against the right boundary line. The resultant polygon of this third stage is shown in FIG. 5(d) and it is $\langle$K, L, M, N, O, P, Q, R, S, T, U, V, $\rangle$. This resultant polygon of the third stage is then fed to the fourth stage to be clipped against the top boundary line. The resultant polygon of this fourth stage and therefore the resultant polygon of the whole polygon clipping process is shown in FIG. 5(e), $\langle$W, X, Y, Z, $\alpha$, $\beta$, $\gamma$, $\delta$, $\rangle$. The resultant polygon of the polygon clipping process is therefore not empty. This example also provides an instance that the third criterion for resultant polygon is not met by the Sutherland-Hodgman algorithm. Also, the coordinates of the vertices, n, w, v, o, H, A, G, O, R, N, S, W, Z, $\alpha$, and $\delta$ are unnecessary computed because ultimately nothing should be displayed.

The Liang-Barsky Algorithm. The Liang-Barsky algorithm also handles each edge separately. Each edge is parameterized and clipped against the window. When processing an edge, the edge is extended to infinity at both ends. There are two cases.

(1) The extended edge originates from a corner region; intersects a boundary line to enter an edge region; intersects another boundary line to enter the window; intersects a boundary line to exit to an edge region; and finally intersects the last boundary line to enter a corner region. If the edge overlaps the first portion of the extended edge, then output the corner of the corner region it originates from. If the edge overlaps the portion of the extended edge that enters the window, then compute the intersection point and output it. If the first endpoint of the edge is inside the window, output it. If the second endpoint of the edge is inside the window, output it as well. If the edge overlaps the portion of the extended edge that exits the window, compute the intersection point on the window boundary and output the intersection point.

(2) The extended edge originates from a corner region; intersects a boundary line to enter an edge region; intersects another boundary line to enter another corner region on the same invisible side as the originating corner region; intersects a boundary line to enter an edge region; and finally intersects a boundary line to enter another corner region. If the edge overlaps the first portion of the extended edge, then output the corner of the originating corner region. If the edge overlaps the portion of the extended edge that exits the second corner region, then the corner of that corner region is also sent to the output.

In this algorithm, a vertex is also processed twice. Each edge must also be parameterized. This is a significant source of inefficiency because the parameterization requires arithmetic operations that are not required by the Sutherland-Hodgman algorithm and the present invention. Again, the last two criteria for the inclusion of vertices in the resultant polygons are not met by this algorithm. Referring to FIG. 6, the Liang-Barsky algorithm includes the window corner A although the whole polygon is clearly outside the window.

SUMMARY OF THE INVENTION

It is an object of the present invention to provide a method for the polygon clipping process which is original and improves upon the number of operations used by the Sutherland-Hodgman algorithm, the Liang-Barsky algorithm, and on the prior art generally, and which meets the criteria for the resultant polygon stated above.

Thus in accordance with the present invention there is provided a method of clipping polygons against a window, in which a vertex is assumed to be in the same group as the preceding vertex until determined to be otherwise. The coherence property first observed by the inventors ensures that determining whether a vertex belonging to the same group as its preceding vertex can be done in a most efficient way. This thus ensures all vertices belong in a group will be processed very efficiently.

Also, with slight modification, the present invention can be turned into a new efficient polyline clipping algorithm.

Further features of the invention will be described or will become apparent in the course of the following description.

DETAILED DESCRIPTION OF THE INVENTION

In the present invention, a coherence property of polygons is used to speed up the rejection of invisible vertices significantly. This is the coherence property: if a vertex of a polygon is outside a boundary line, it is very likely that the next vertex is also outside the same boundary line.

This coherence property used by the present invention is entirely different from the coherence property described in Foley & van Dam (J. D. Foley and A. Van Dam, *Fundamental of interactive computer graphics*, Addison-Wesley, Reading, Mass., 1982, page 561–565.) which states that if a line segment intersects a scan line on the screen of a video display terminal, then it is likely that it will intersect the next scan line. This property, unlike the one used by the present invention, is used in scan conversion, not polygon clipping. The coherence property used in the present invention is original.

Using the coherence property originally observed by the inventors of the present invention, once a vertex is known to be outside a boundary line, the following vertex is checked to see if it is also outside the same boundary line. This check requires only one comparison. If the vertex is indeed outside the same invisible side, it is discarded. The next vertex is then similarly checked. This process continues until a vertex not outside the boundary line is encountered. Thus the vertices are processed exactly once.

For instance, suppose there are $\eta$ consecutive vertices outside the left boundary line. To use the coherence property, once it is known the first vertex is outside the left boundary line, exactly one comparison is used to determine that each individual vertex of the following $\eta-1$ vertices is outside the left boundary line and reject it. This compares to 2 comparisons for the Sutherland-Hodgman algorithm if the left boundary line is the boundary line used in the first stage of its clipping pipeline. More comparisons are necessary if the left boundary line is the boundary line in one of the later stages. The number of comparisons for each vertex can be 2, 4, 6, or 8 depending in which stage the vertex is rejected in the pipeline. For the Liang-Barsky algorithm, each of the $\eta-1$ edges will be parameterized first. Operations used for parameterization alone are much more expensive than the $\eta-1$ comparisons used by the present invention.

Figure 1A:
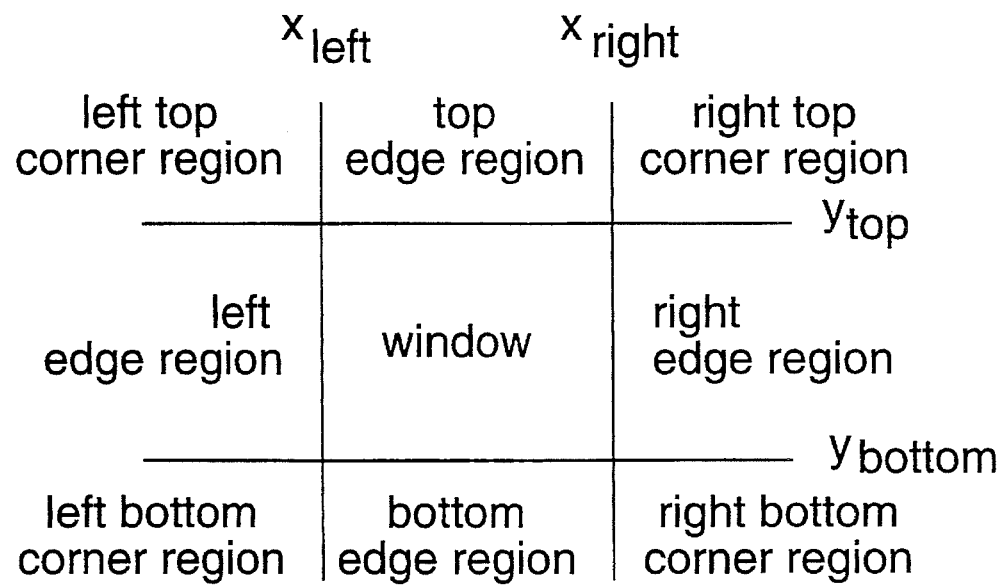
FIG. 1(a) shows the names of the regions on the two-dimensional plane partitioned by the four boundary lines.
Figure 1B:
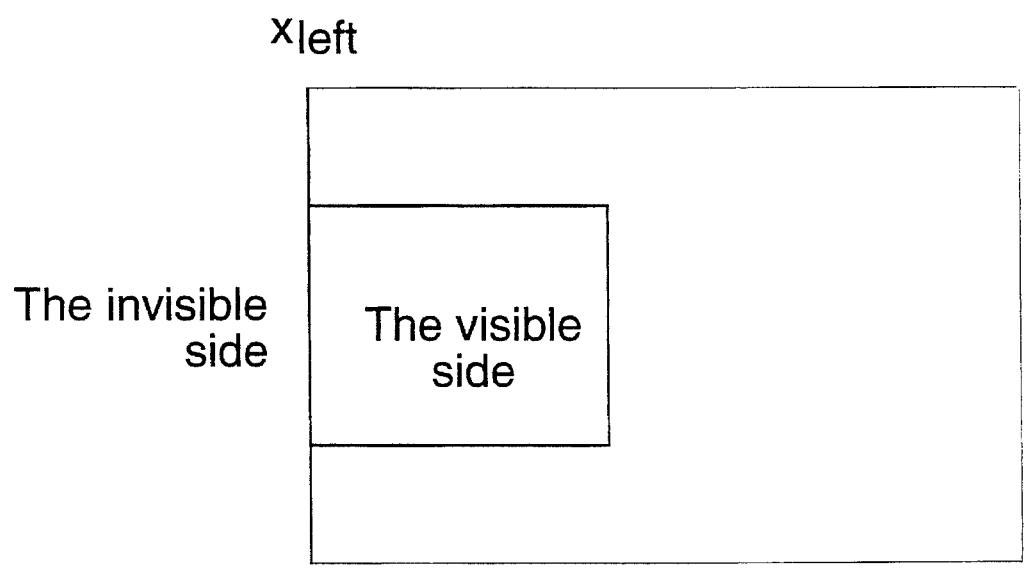
FIG. 1 (b) shows the invisible side and the visible side of the left boundary line.
Figure 2:
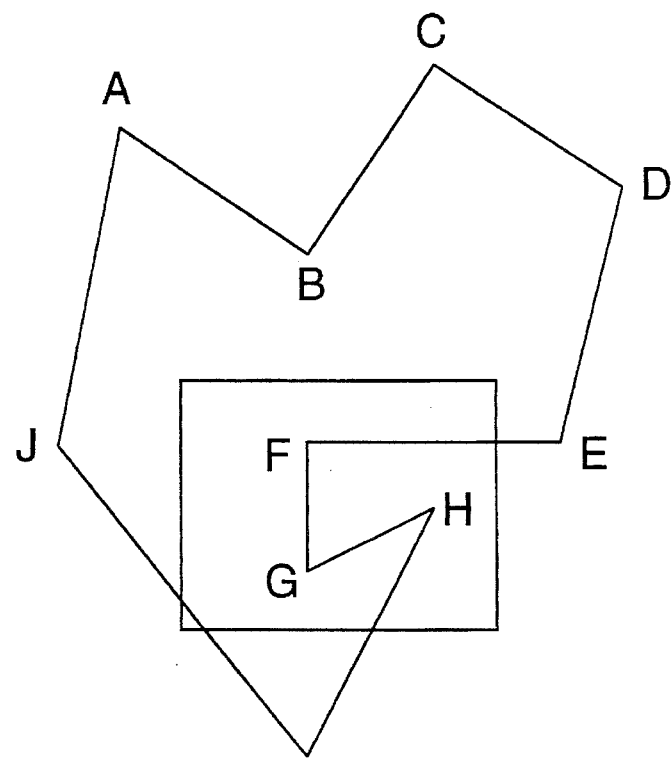
FIG. 2 shows the classification of the vertices in a polygon into the first group, visible and invisible groups, and the last group. The polygon $\langle A, B, C, D, E, F, G, H, I, J, \rangle$ consists of the list $\langle A, B, C, D, \rangle$, the first group; the list $\langle F, G, \rangle$, a visible group; $\langle \rangle$an invisible group; $\langle \rangle$an empty visible group; and $\langle J, \rangle$, the last group.

To take advantage of the coherence property, the vertices of an input polygon are separated into groups of consecutive vertices. There are four kinds of groups. The first kind is the first group, beginning from the first vertex of the polygon, to the first intersection point the polygon makes with the window, or to the last vertex of the polygon if there is no intersection point. If the last vertex is in the first group, then the polygon has only one group, the first group. A visible group is a group of consecutive visible vertices immediately after an intersection point and before the next intersection point. An invisible group is a group of consecutive invisible vertices starting immediately after an intersection point to the vertex immediately before the next intersection point. The last group consists of consecutive vertices after the last intersection point of the polygon to the last vertex of the polygon. The input polygon can be seen as having the first group, then visible and invisible groups alternating, then the last group. There can be an empty visible group between two intersection points. But each invisible group has at least one vertex. In FIG. 2, the visible group between the invisible group $\langle \rangle$and the last group $\langle J, \rangle$is empty. However, it is a visible group nonetheless.

Each vertex of the polygon is handled in the order it occurs in the polygon. The classification of the vertices into the groups is done alongside the processing of each vertex. The vertices are not processed to form the groups before being clipped. Instead, a vertex is first assumed to be in the present group before determined to be otherwise.

To ensure the process stop after processing the last vertex of the polygon, a sentinel vertex is used. This vertex is set to be outside the present group before the present group is processed. For example, before processing a visible group of vertices, the sentinel vertex is set to be outside the window.

Visible Groups. To process a visible group, simply check each vertex in the group against all four boundary lines. Output each vertex found to be inside the window. If a vertex is outside a boundary line, it is outside the window. Clip the edge connecting the last vertex of the visible group and the vertex following it. Compute and output the intersection point it makes with the window.

The following is the pseudo-code for handling a visible group, where i is used to index the vertices of the input polygon.

```
start:
    if (x[i] >= xleft)
        if (x[i] <= xright)
            if (y[i] >= ybottom)
                if (y[i] <= ytop) {
                    output(x[i], y[i]);
                    i = i + 1;
                    goto start;
                }
```

The handling of vertices and intersection points after a visible group will be described later.

Invisible Groups. Handling an invisible group is more complicated than handling a visible group. To simplify the explanation, an invisible group can be further divided into invisible subgroups in the following manner:

(1) The first vertex must be outside the boundary line the preceding intersection point is on. Call this invisible side the designated invisible side.

(2) Determine if the next vertex is on the designated invisible side. Stop when a vertex not on the designated invisible side is encountered. This completes an invisible subgroup. To form the next invisible subgroup, detach the subgroup just completed. Determine if the edge connecting the last vertex of the just-completed invisible subgroup and the vertex following it intersects the window. If so, the invisible group ends. Otherwise, find one of the invisible sides the second vertex of the edge is on. This invisible side is the designated invisible side of the next invisible subgroup. Carry on this step until an intersection point is found.

An empty invisible subgroup is assumed if the boundary line the intersection point following the invisible group is on is not the same as the boundary), line whose invisible side is the designated invisible side of the last invisible subgroup of the invisible group.

Each vertex of each invisible subgroup with the exception of the first vertex and the last vertex can be rejected using exactly one comparison. As an example, to handle an invisible subgroup outside the left boundary line, the following piece of code is sufficient.

```
while (x[i]<xleft)
    i=i+1;
```

Of course, when processing an input polygon it is usually unknown whether an invisible group has ended after an invisible subgroup has been processed. To determine that, a line clipping algorithm is used to clip the edge with the first endpoint being the last vertex of the last invisible subgroup processed, and the second endpoint the vertex following it. If the line clipping produces no intersection point, then the processing of the current invisible group should continue and a new invisible subgroup started. Otherwise, the invisible group has ended and a visible group has begun.

The details of the line clipping algorithm used will be discussed in the next section.

After an invisible group has been processed, the next task connects the intersection points preceding the first vertex and succeeding the last vertex of the invisible group.

Performing Line Clipping. To perform the line clipping task in the present invention, one of the line clipping algorithms, the Cohen-Sutherland, the Liang-Barsky, the Nicholl-Lee-Nicholl (Tina M. Nicholl, D. T. Lee, and Robin A. Nicholl, *An efficient new algorithm for 2-d line clipping: Its development and analysis,* Computer Graphics, volume 21 (1987), no. 4, page 253–262.) algorithms can be used. To save further operations, the Nicholl-Lee-Nicholl line clipping algorithm is modified to complement better with the invention.

The endpoints of the edge to clip are either the last vertex of a visible group and the succeeding vertex, or the last vertex of an invisible subgroup and the succeeding vertex.

Suppose the endpoints of the edge are the last vertex of a visible group and the immediate following vertex. In the process of finding the vertex immediately following the last vertex of a visible group to be outside the window, the second endpoint is found to be outside the left boundary line, outside the right boundary line, inside both the left and the right boundary lines but outside the bottom boundary, or inside both the left and the right boundary lines but outside the top boundary line. For the latter two cases, the edge must intersect the window boundary on the bottom and top boundary lines respectively. In these cases, the intersection point can be computed simply and output. Then the processing of a new invisible group with the first invisible subgroup outside the boundary line with the intersection point can begin. If the second endpoint is outside the left or the right boundary lines, find the horizontal boundary line the second endpoint is outside. The line clipping routine is then invoked. For instance, the intersection point on the top boundary line can be computed using the following equations, where $(x_1, y_1)$, $(x_2, y_2)$, and $(x_i, y_i)$ the first endpoint, second endpoint, and the intersection points respectively.

$$x_i = x_1 + (x_2 - x_1) \times (y_{top} - y_1)/(y_2 - y_1)$$

$$y_i = y_{top}.$$

The equations for an intersection point on the bottom boundary line is similar.

Suppose the endpoints are the last vertex of an invisible subgroup and the vertex succeeding it. Without loss of generality, suppose the invisible subgroup is outside the left boundary line. The relative locations of the first endpoint and the vertical boundary lines are known, the first endpoint being outside the left boundary line. First, find the relative locations of the first endpoint and the horizontal boundary lines. This is accomplished by comparing the y-coordinate of the first endpoint to the y-coordinates of the top and bottom boundary lines. At most two comparisons are needed. If the first endpoint is outside a horizontal boundary line, check if the second endpoint is also outside the same horizontal boundary line. If so, then the next invisible subgroup in the same invisible group has been found. No further line clipping computation is required. Proceed to process the next invisible subgroup. Thus, the region the first endpoint is in is determined. Second, determine the region the second endpoint is in. To find the relative locations of the second endpoint and the vertical boundary lines, use the information that the first endpoint is outside the left boundary line. The second endpoint cannot be outside the left boundary line too (or the invisible subgroup outside the left boundary line would continue). Compare the x-coordinates of the second endpoint and the right boundary line to find out whether the second endpoint is outside the right boundary line or between the vertical boundary lines. Similarly, the endpoints cannot be outside the same horizontal boundary lines. If the first endpoint is outside a horizontal boundary line, the the second endpoint must not. Comparing the y-coordinates of the second endpoint and the other horizontal boundary line determined whether the second endpoint is outside the other horizontal boundary line or between the two horizontal boundary lines. If the first endpoint is between the two horizontal boundary lines, then the y-coordinates of both horizontal boundary lines must be compared to the y-coordinate of the second endpoint to find out the relative locations of the horizontal boundary lines and the second endpoint. The regions of the two endpoints have now been determined.

Now, check whether the edge intersects the window boundary. There are four cases; the first endpoint is outside a vertical boundary line only; the first endpoint is outside a horizontal boundary line only; the first endpoint is outside a vertical and a horizontal boundary lines; or the first endpoint is in the window.

If the first endpoint is in the window, the first endpoint of the clipped edge is simply the first endpoint of the edge. The differences of the coordinates of the endpoints are computed to determine the the second endpoint of the clipped edge.

If the first endpoint is outside a vertical and a horizontal boundary lines, then compute the quotients of the boundary lines the first endpoint are outside of with respect to the edge. The first endpoint of the clipped edge is on the boundary line with the larger quotient, if the edge intersects the window boundary. If the boundary line with the larger quotient is a vertical boundary line, handle it as if the first endpoint is outside a vertical boundary line only. Similarly for the other case.

If the first endpoint is outside a vertical boundary line only, compute the y-coordinate of the intersection point ($y_i$) the edge makes with the vertical boundary line, using the quotient and differences of the coordinates of the endpoints computed earlier. Suppose the vertical boundary line is the left boundary line. The equation for $y_i$ is:

$$y_i = y_1 + \delta_y \times q_{left}$$

where $q_{left}$ is the quotient of the left boundary line with respect to the edge:

$$q_{left} = (x_{left} - x_1)/\delta_x.$$

If the intersection point is outside the window and below the bottom boundary line ($y_i < y_{bottom}$), the first vertex of the next invisible subgroup outside the bottom boundary line has been encountered. Proceed to process that invisible subgroup. Similarly, if the intersection point is above the top boundary line, the next invisible subgroup is outside the top boundary line. If the intersection point is in the window, then include the window corners between the previous intersection point and the newly computed intersection point. Then output the intersection point.

If the first endpoint is outside a horizontal boundary line only, the processing is similar to the case where the first endpoint is outside a vertical boundary line only.

If the first endpoint is in the window, compute the intersection point the edge makes with the window boundary. If the edge is not invisible but both endpoints are invisible, then compute the other intersection point the edge makes with the window boundary. The operations performed are very similar to the operations used for computing the first endpoint of the clipped edge, except that there is no need to check whether the intersection point is visible, and if the second endpoint is in a corner region, the second endpoint of the edge is on the boundary line delimiting the corner region with the smaller quotient with respect to the edge. This intersection point is output. If the second endpoint is in the window, then the beginning of a new visible group is encountered. Process this visible group as described earlier. If the second endpoint is not in the window, a new invisible group has been encountered. Store the boundary line the second endpoint of the clipped edge is on, and process the invisible group as described earlier.

Including Window Corners. After an invisible group has been processed, the intersection point immediately before the just-processed invisible group and the intersection point immediately after it must be connected by edges on the window boundary. Each of these edges connects one of the intersection points to a window corner, connects two intersection points, connects one window corner to one of the intersection points, or connects two adjacent window corners. Thus, the process to connect the two intersection points can be seen as including window corners between the two intersection points.

Figure 3:
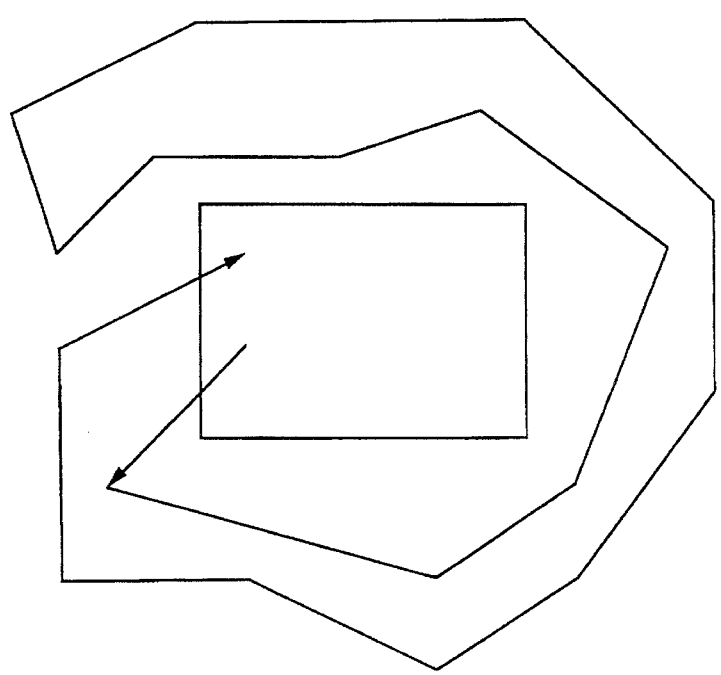
FIG. 3 shows the connecting of two intersection points must be performed carefully and that although the vertices between the two intersection points can be spreaded out widely, window corners required to connect them can be few.

In the present invention, the fewest edges is used to connect two consecutive intersection points by delaying the inclusion of window corners until the whole invisible group has been processed. A simple example illustrates the importance of the delay. Suppose an edge exits the window through the left boundary line and then winds its way in a counterclockwise fashion without intersecting the window for one revolution and then unwinds in a clockwise fashion, again without intersecting the window, back to the left boundary edge region and enters the window again just above the previous intersection point (See FIG. 3). It is obvious in this example that no window corners are needed to connect the two intersection points. But without delaying the inclusion of the window corners, many window corners would have been included as are by the Sutherland-Hodgman and Liang-Barsky algorithms.

Figure 4:
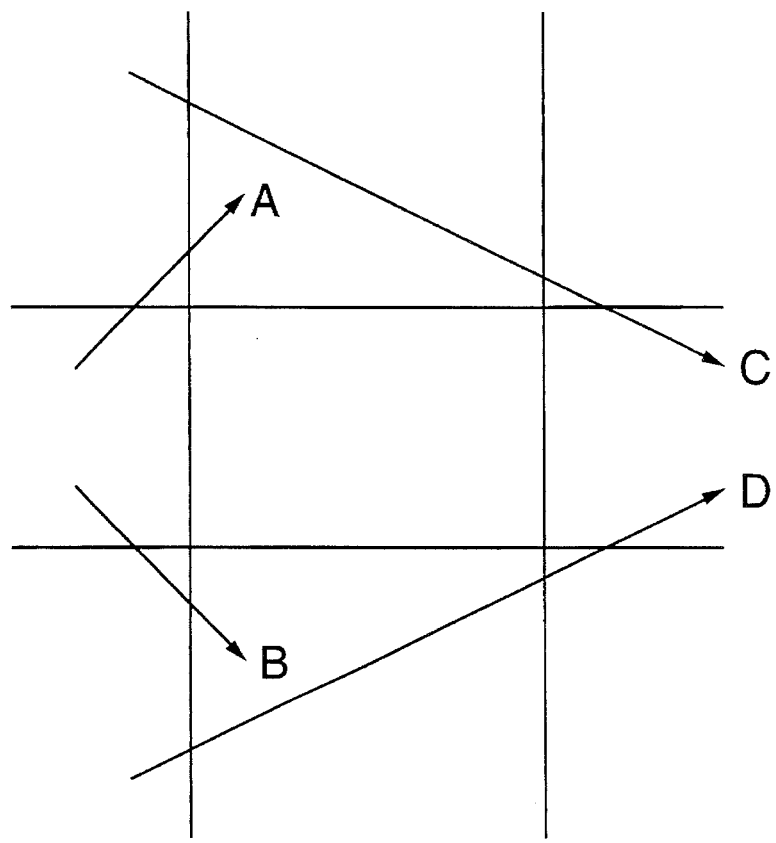
FIG. 4 shows the four possible number of window corners between the last vertex of an invisible subgroup and the first vertex of the next invisible subgroup in the same invisible group. The four possible numbers of window corners if the previous designated invisible side is the left invisible side: −1 for A from left to top, +1 for B from left to bottom, −2 for C from left to right in the negative direction and +2 for D from left to right in the positive direction.
Figure 6:
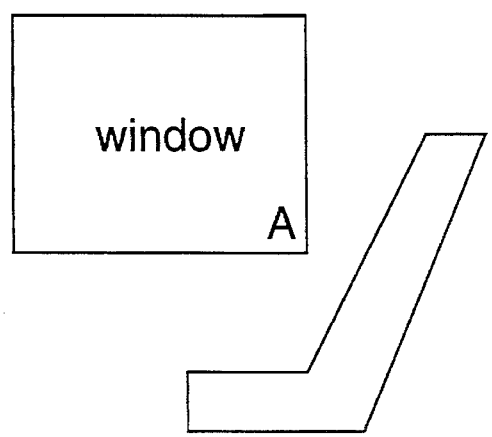
FIG. 6 shows the inclusion of an unnecessary window corner in the Liang-Barsky algorithm. It shows an example to show that the Liang-Barsky algorithm includes unnecessary window corner A when the whole polygon is outside the window.
Figure 5A:
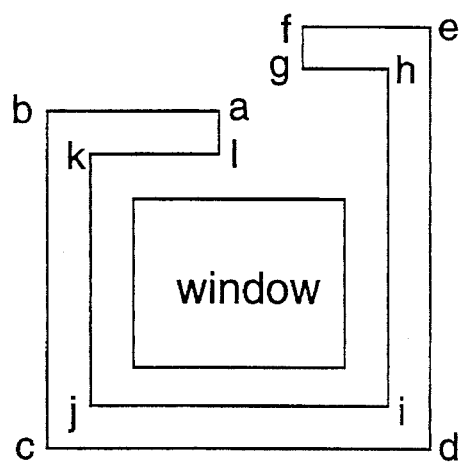
FIG. 5 shows the peril of clipping a polygon against one clipping plane at a time. An example to show that the Sutherland-Hodgman algorithm does not satisfy criterion (4) of resultant polygon. (a) The original polygon and the window. (b) After clipping against the left boundary line. (c) After clipping against the bottom boundary line. (d) After clipping against the right boundary line. (e) After clipping against the top boundary line.
Figure 5D:
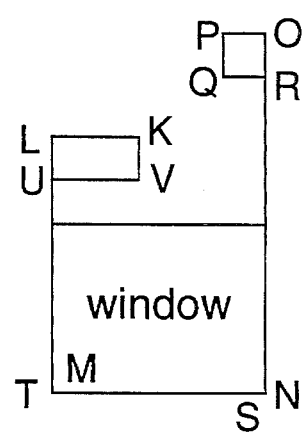
Figure 5B:
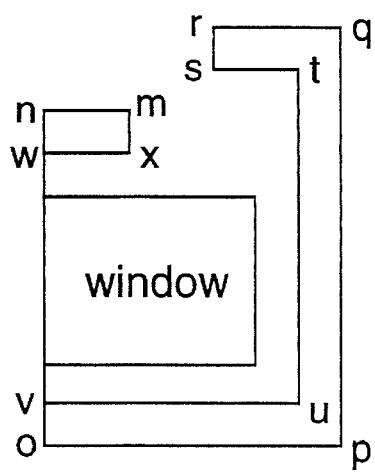
Figure 5E:
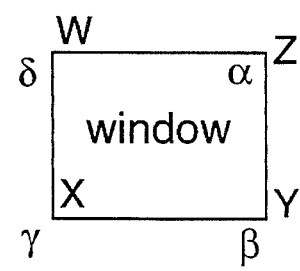
Figure 5C:
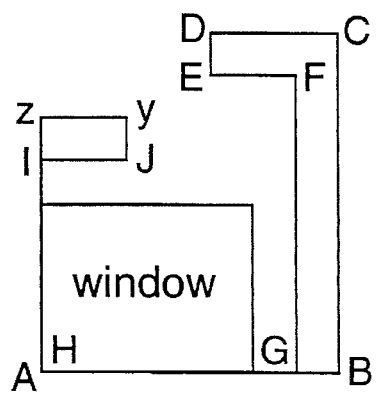

To output only the fewest window corners, arbitrarily set the counterclockwise direction the positive direction. The clockwise direction is the negative direction. Then, after an invisible subgroup has been processed and the designated invisible side of the next invisible subgroup determined, compute the number of window corners between the designated invisible side of the previous invisible subgroup and the designated invisible side of the next subgroup. This number is assigned a sign by the direction from the previous designated invisible side to the next designated invisible side, with the window in the center. See FIG. 4 for the possible numbers of window corners when the designated invisible side of the previous invisible subgroup is the left invisible side.

Adding all the numbers of window corners between two invisible subgroups in an invisible group produces the correct number of window corners to output. To know which window corners to output, start from the first designated invisible side of the invisible group. Following the direction given by the sign of the sum of the window corners, output as many window corners as given by the magnitude of the sum. For example, suppose the starting designated invisible side is the left invisible side and the sum is −6. Starting from the left invisible side mid in the negative direction (the clockwise direction) output six window corners: the left top, right top, right bottom, left bottom, left top, and the right top window corners.

The First and the Last Groups. If the first vertex is visible then all the vertices in the first group are visible. All the vertices in the last group must also be visible by virtue of the definition that the first vertex and the last vertex of the polygon are identical. A visible first group is handled exactly the same as any other visible groups. A visible last group is handled also the same as other visible groups except that it must be careful not to continue the process after the last vertex has been processed. To halt processing after the last vertex, an exception mechanism or a sentinel vertex can be used. The former mechanism can be used to signal the end of a vertex list if the coordinates of the vertex list is stored in file. The latter mechanism can be used if the vertex list is stored in arrays.

Handling an invisible first group is very similar to the handling of an ordinary invisible group except that the number of window corners between the first vertex and the first intersection point is counted and stored away. For the last group, similarly, the number of window corners between the last intersection point of the polygon and the last vertex is counted. To find out which window corners should be output to connect the last intersection point and the first intersection point of the polygon, sum the numbers of window corners collected for the first and the last groups. Then, the designated invisible side of the first subgroup of the first group and the designated invisible side of the last subgroup of the last group must be harmonized. The harmonization is necessary because if the first vertex is in a corner region, the designated invisible side of the first subgroup of the first group can be either of the invisible sides the first vertex is on. The designated invisible side of the last subgroup of the last group can therefore be different from the designated invisible side of the first subgroup of the first group. This is true despite that the first and the last vertices are identical. If the two designated invisible sides are different and the first designated invisible side is one invisible side away from the last designated side in the negative direction, subtract one from the sum. If the designated invisible sides are different and the first designated invisible side is one invisible side away from the last designated invisible side in the positive, add one to the sum.

For instance, suppose the first vertex is in the left top corner region, the first designated invisible side is top, the first intersection point is on the top boundary line, the last intersection point is on the left boundary line and the last intersection point is on the left boundary line. Suppose the sum of the numbers of window corners of the first and the last groups is zero. But since the first designated invisible side is one invisible side away from the last designated invisible side in the negative, one is subtracted form the sum. This produces the correct result of negative one.

A Special Case. There is one special case that must be handled separately. If no intersection point is produced after clipping the whole polygon, there are two possible scenarios. The whole window can be inside the polygon or the whole polygon is outside the window. These two cases can be differentiated easily by checking the number of window corners traversed. If the value is zero, it means that the whole polygon is outside the window. In this case, the clipped polygon is empty. If the number of window corners is not zero, then it must be a multiple of four. The four window corners are output as many times as necessary in the direction dictated by the sign of the number of window corners.

The Invention Implemented in the Programming Language 'C'. The invention can be implemented in any of the programming languages available. The following is a full implementation in 'C'. The use of another language to implement the invention can be accomplished by those skilled in the computer arts. The implementation uses only the devices provided by the programming language 'C' in implementing the invention. Features in other programming languages that facilitate a simpler implementation include jumping to a destination stored in a variable, the construction of jump tables, etc. The vertex list does not have to be stored in arrays. Instead, a file can be used to store the coordinates of the vertices. The following implementation assumes the vertex list to be stored in arrays.

A New Polyline Clipping Algorithm. A very efficient polyline clipping algorithm can be obtained by simplifying the new polygon clipping algorithm. The difference is the absence of code for handling window corners which is not necessary for polylines. However, the coherence property is still valid for polylines. All the benefits provided by using that property are also shared by the polyline clipping algorithm.

Conclusion. A very efficient polygon clipping algorithm has been presented. It uses a coherence property of polygons to significantly improve the efficiency to reject consecutive invisible vertices outside the same boundary line. As it processes each vertex exactly once, the processing of visible vertices is also much faster than the Liang-Barsky and the Sutherland-Hodgman algorithms. Even with the device to output only the fewest window corners to connect two consecutive intersection points included, this algorithm is still much more efficient than the Liang-Barsky and the Sutherland-Hodgman algorithms.

A very efficient polyline algorithm can also be obtained by modifying the polygon clipping algorithm.

Although only a two-dimensional window has been used in the present invention, the coherence property can be applied to polygon clipping in three dimensions against cuboids and frustums.

It will be appreciated that the above description relates to the preferred embodiment by way of example only. Variations on the invention will be obvious to those skilled in the field, and such obvious variations are within the scope of the invention as described and claimed, whether or not expressly described.

On the immediately following pages, a C implementation of the algorithm is provided.

| An Implementation | |
| --- | --- |
| | Section |
| An implementation of the polygon clipping algorithm | 1 |
| The main procedure | 7 |
| Handle a visible group | 16 |
| Handle an invisible subgroup on the left invisible side | 17 |
| Post-processing after an invisible subgroup | 21 |
| Post-processing after a visible group | 26 |
| Line clipping Routine | 34 |
| Finishing up the main procedure | 52 |
| Including window corners | 55 |

-continued

An Implementation

| | Section |
|---|---|
| Index | 58 |

1. An implementation of the polygon clipping algorithm. This is an implementation in the programming language c and as such uses only features available in c. There may be features in other programming languages that facilitate a more efficient implementation of the present invention in some aspects. These aspects will be noted and explained.

The explanation will be in a top-down fashion with details often deferred until a later but more appropriate time. This should also separate the different concerns of the process. For instance, the details on clipping an edge connecting the last vertex of a group and the immediate vertex after it are separated from the details on how the groups are processed. This can be done despite that these two processes are performed one right after the other.

2. The overall structure of the implementation consists of three parts, the part for declaring global variables for the program, the functions and procedures used by the program, and finally the main procedure of the program.

---

<Global variables 6>
    <Functions 33>
    <The main procedure 7>

---

3. Definitions and global variables. For convenience, define a loop statement without condition for c. It is simply the for loop without parameters.

--- define loop for (;;)

---

4. Often a specific boundary line will be referred in the program. It is therefore convenient to define a specific value for each boundary line. As there are four boundary lines, four bits are used to specify the four boundary lines. The designation of which bit to which boundary line is arbitrary as long as there is no duplication. It is also necessary to specify the window. It is set to zero.

--- define LEFT #8
define BOTTOM #4
define RIGHT #2
define TOP #1
define MIDDLE #0

---

5. It is also necessary to designate which region a vertex is in. This is needed only in the line clipping process. A vertex is in an edge region of a vertical boundary line (in the left or the right edge region), in an edge region of a horizontal boundary line (in the top or the bottom edge region), in a corner region, or in the window. These four possibilities are specified below.

--- define XX 1 define YY 2
define XY (XX|YY)
define WINDOW 0

---

6. The program uses quite a few global variables. These variables are used for storing information that are needed later on, for storing window corners encountered, etc. They will be declared and explained when they are first used. The programming language c lacks a boolean type. A bool data type is defined here.

---

<Global variables 6>≡
    typedef enum {FALSE, TRUE}bool;

See also sections 10, 13, 15, 20, 22, 29, 37, 41, 43, 47, and 54.
This code is used in section 2.

---

7. The main procedure. The procedure clip_polygon is the main procedure of the program. The parameters passed in are the arrays storing the coordinates of the vertices of the input polygon, the number of vertices in the input polygon, the arrays for storing the coordinates of the vertices of the resultant polygon (after clipping the polygon against the window), and the number of vertices in the resultant polygon. The four coordinates of the boundary lines are also passed in.

Although arrays are used in this implementation, the present invention can be modified easily to obtain the coordinates of the vertices of a polygon from a file and write the coordinates of vertices of the resultant polygon to a file.

The arrays ix[], iy[], iox[], and ioy[] store the x and y coordinates of the vertices in the input polygon, and x and y coordinates of the vertices in the resultant polygon respectively. The number of vertices in the input polygon is in isize and the number of vertices in the resultant polygon is in iosize. The coordinates of the left, right, bottom, and top boundary lines are passed in through ixleft, ixright, iybottom, and iytop respectively.

The convention of this program is to ignore the zeroth element of an array. Each array begins with [1] and not [0]. This convention is not significant to the algorithm at all.

The header and the main sections of the main procedure looks like this:

---

<The main procedure 7>≡
    void clip_polygon (ixleft,ixright,iybottom,iytop,ix,iy,isize,iox,
    ioy,iosize)
        double ixleft, ixright, iybottom, iytop, ix[], iy[], iox[],
        ioy[];
        int isize, *iosize; {<Local variables in clip_polygon 8>
        <Initialization for the whole program 9>
        <Handle vertices 16>
        <Finishing up 52>
        }

This code is used in section 2.

8. There are two local variables for the procedure. The variable i is used to index the input vertex arrays and cornernum is used to count the number and the direction of window corners from the previous intersection point to the current designated invisible side. If the group being processed is the first group and it is invisible, then cornernum stores the number and direction of window corners between the designated invisible side of the first vertex and the current designated invisible side.

<Local variables in clip_polygon 8>≡
    int i, cornernum;

This code is used in section 7.

9. To reduce the number of parameters passed around from the main procedure to the procedures and functions it uses, the parameters of clip-polygon are all assigned to global variables. The variable ixleft becomes xleft, ixright becomes xright, etc. for all the parameters of the main procedure.

<Initialization for the whole program 9>≡
    xleft = ixleft;
    xright = ixright;
    ybottom = iybottom;
    ytop = iytop;
    x = ix;
    y = iy;
    ox = iox;    /* assigning pointers to arrays */
    oy = ioy;
    size = isize;
    osize = iosize;

See also sections 11, 12, and 14.
This code is used in section 7.

10. It is thus necessary to declare these global variables.

<Global variables 6>+≡
    double xleft, xright, ybottom, ytop;
    double *x, *y, *ox, *oy;
    int size, *osize;

11. To meet the condition that the first and the last vertices of the input polygon should be the same, the first vertex is simply appended to the vertex list. The number of vertices is increased by one.

If the coordinates of the vertices are read from a file, this is done differently. An exception mechanism should be set up such that when the coordinates of the last vertex of the polygon have been mad, the exception mechanism should take over and pass the coordinates of the first vertex to be processed. The exception mechanism is then set up again such that it will catch another attempted read operation from the file.

<Initialization for the whole program 9>+≡
    size = size + 1;
    x[size] = x[1];
    y[size] = y[1];

12. Next, the variable used to index the vertex list of the input polygon is set to one; the number of window corners and vertices in the resultant polygon are set to zero; and the boolean variable no_visible is sdt to TRUE to indicate there has not been an intersection point computed or a visible vertex found yet.

<Initialization for the whole program 9>+≡
    i = 1;
    cornernum = 0;
    osize = 0;

-continued
    no_visible = TRUE;

13. As usual, the global variable no_visible must be declared.

<Global variables 6>+≡
    bool no_visible;

14. Next, determine the designated invisible side for the first vertex of the input polygon if it is invisible. Then, according to the designated invisible side, jump to the appropriate place to handle the first invisible subgroup of the first group. The original designated invisible side is stored to be used after the last group has been processed. The variable used to store this piece of information is called original_side. If the first vertex is visible, then process the first visible group.

<Initialization for the whole program 9>+≡
    if (x[1] < xleft) {
        original_side = LEFT;
        goto LEFT_SIDE;
    }
    if (x[1] > xright) {
        original_side = RIGHT;
        goto RIGHT_SIDE;
    }
    if (y[1] < ybottom) {
        original_side = BOTTOM;
        goto BOTTOM_SIDE;
    }
    if (y[1] > ytop) {
        original_side = TOP;
        goto TOP_SIDE;
    }
    no_visible = FALSE;
    goto IN_WINDOW;

15. Declare the global variable original_side.

<Global variables 6>+≡
    int original_side;

16. Handle a visible group. To handle a visible group, first set up the sentinel vertex for a visible group. This sentinel vertex is used to prevent the program from exhausting the vertex list unknowingly. The sentinel vertex can be any point outside the window. As the left boundary line is examined first, the x coordinate of the sentinel vertex is set to 1.0 to the left of the left boundary line. The y coordinate of the sentinel vertex is not set and is never examined.

If the coordinates of the vertices of the input polygon are not stored in arrays but instead read from a file, sentinel vertices cannot be used. An exception mechanism should be used instead. The exception mechanism should be invoked whenever an attempt to read a coordinate past the last vertex of a polygon is detected. This serves the same purpose of not having to check if the vertex list has been exhausted, an operation that does not contribute to the resultant polygon.

After a vertex found to be outside the window has been encountered, the next step computes the intersection point beyond the last vertex of the visible group just completed. This will be discussed in the parts on line clipping.

```
#define SENTINEL size + 1
<Handle vertices 16>≡
    IN_WINDOW:
        x[SENTINEL] = xleft - 1.0;
        outp(x[i], y[i]);
        i++;
        loop
        { /* Exited when the last vertex has been processed. */
            if (x[i] ≧ xleft) {
                if (x[i] ≦ xright) {
                    if (y[i] ≧ ybottom) {
                        if (y[i] ≦ ytop); {
                            outp(x[i], y[i]);
                            i++;
                            continue;
                        }
                        <Intersection point on the top
                            boundary 32>
                    }
                    <Intersection point on the bottom
                        boundary 31>
                }
                <(x[i], y[i]) on the right invisible side 30>
            }
            <(x[i], y[i]) on the left invisible side 27>
        }
```

See also sections 17, 18, and 34.
This code is used in section 7.

17. Handle an invisible sub group on the left invisible side.
To handle an invisible subgroup on the invisible side of the left boundary line, only a simple loop is required. After all the vertices of the invisible subgroup have been processed, a line clipping routine is necessary to determine whether the current invisible group is completed. The details will be left to a later section.

As usual, the sentinel vertex must be set up. This time, it is set to a point on the left boundary line, clearly not on the invisible side of the left boundary line.

The coherence property, with the use of a sentinel vertex, thus ensures that only one comparison is required to process each vertex in an invisible subgroup on the invisible side of the left boundary line, except the first and the last vertices of the invisible subgroup.

If the vertices are stored in a file, an exception mechanism can be set up such that reading past the end of the file invokes a procedure. The setup of exception mechanism varies among systems. But it usually does not require any arithmetic operations, only a few assignment statements to indicate the location of the procedure invoked by the exception and the activation of the exception.

```
<Handle vertices 16>+≡
LEFT_SIDE:
    x[SENTINEL] = xleft;
    do
    {
        i++;
    }
    while (x[i] < xleft);
    <After a left invisible subgroup 19>
```

18. Similarly, invisible subgroups on the invisible sides of the right, bottom, top boundary lines can be handled in the same fashion. The sentinel vertex can be set to be on the boundary line in each case.

```
<Handle vertices 16>+≡
RIGHT_SIDE:
    x[SENTINEL] = xright;
    do
    {
        i++;
    }
    while (x[i] > xright);
    <After a right invisible subgroup 25>
TOP_SIDE:
    y[SENTINEL] = ytop;
    do
    {
        i++;
    }
    while (y[i] > ytop);
    <After a right invisible subgroup 24>
BOTTOM_SIDE:
    y[SENTINEL] = ybottom;
    do
    {
        i++;
    }
    while (y[i] < ybottom);
    <After a right invisible subgroup 23>
```

19. Right after an invisible group on the invisible side of the left boundary line has been completed processed, it is necessary to determine whether all the vertices of the input polygon have been processed and the last vertex processed is indeed the sentinel vertex. Final processing will be done to the first and last groups if it is.

```
<After a left invisible subgroup 19>≡
    if (i > size) {
        last_side = LEFT;
        goto ENDGAME;
    }
```

See also section 21.
This code is used in section 17.

20. Naturally, the global variable last_side must be declared.

```
<Global variables 6>+≡
    int last_side;
```

21. Post-processing after an invisible subgroup. After an invisible subgroup on the invisible side of the left boundary line has been processed and after it has been determined that the last vertex of the input polygon has not been processed, the edge connecting the last vertex of this invisible subgroup and the vertex following it must be clipped to determine whether the current invisible group should continue or it is complete. This is done by using the Nicholl-Lee-Nicholl line clipping algorithm (Tina M. Nicholl, D. T. Lee, and Robin A. Nicholl, *An efficient new algorithm for 2-d line clipping: Its development and analysis,* Computer Graphics, volume 21 (1987), no. 4, page 253-262.). However, the algorithm used here is a modified version of the algorithm.

Let the last vertex of the invisible subgroup be $P_1$, (x[i-1], y[i-1]) and the vertex following it $P_2$, (x[i], y[i]). The first step of the modified line clipping algorithm determines the region $P_1$ is in. This is done by finding all the invisible sides $P_1$ is on. At the same time, if $P_2$ is found to be on one of the invisible sides $P_1$ is on, no further determination is necessary because the next invisible subgroup has been found. The topology of the two points are shown in the diagram below.

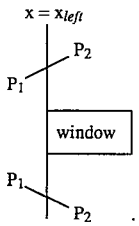

This happens only when both $P_1$ and $P_2$ are on the invisible side of the top or the bottom boundary lines. When this happens, before the next invisible subgroup is processed, the number of window corners from the previous intersection point (if it exists) or the first vertex (if the first group is being processed) should be updated. The variable cornernum is incremented by one if both are on the invisible side of the bottom boundary line. It is decremented by one if both points are on the invisible side of the top boundary line. Then simply go to the appropriate place to start processing the next invisible subgroup.

Otherwise, if not both are on the invisible side of the top and bottom boundary lines, record down the region of $P_1$. Further processing is needed to determine whether the edge intersects the window or not.

The variables used to store the information are yb1 for the coordinate of the horizontal boundary line whose invisible side $P_1$ is on, sy for the representation of this boundary line (BOTTOM or TOP), and c1 for the region of $P_1$. The value of c1 is set to XX if $P_1$ is on the left edge region. Otherwise it is set to XY. And it is known that $P_1$ is on the invisible side of the left boundary line. This is recorded by setting the value of xb1 to xleft, and sx to LEFT.

It is also necessary to determine the number of window corners between the designated invisible side of the just-processed invisible subgroup and the designated invisible side of the next invisible subgroup if the current invisible group is not complete. For instance, the designated invisible side of the invisible subgroup just processed is the invisible side of the left boundary line. If the current invisible group is not completed and the designated invisible side of the next invisible subgroup is the invisible side of the top boundary line, then the number of window corners between the two designated invisible sides is −1. But if the designated invisible side of the next invisible subgroup is the invisible side of the bottom boundary line, then the number of window corners between the two designated invisible sides is +1. It is more tricky if the designated invisible side of the next invisible subgroup is the invisible side of the right boundary line. In this case, it is also necessary to know whether the edge connecting $P_1$ and $P_2$ goes around the left bottom window corner or the left top window corner. For the former case, the number of window corners between the two designated invisible sides is +2. For the latter, it is −2. The variables rightnum, bottomnum, and topnum are used to stored these values.

After all of these have been done, the line clipping routine is invoked.

```
<After a left invisible subgroup 19>+≡
    if (y[i − 1]<ybottom) {
        if (y[i]<ybottom) {
```

```
            cornernum++;
            goto BOTTOM_SIDE;
        }
        yb1 = ybottom;
        sy = BOTTOM;
        c1 = XY;
        rightnum = 2;
    }
    else if (y[i − 1]>ytop) {
        if (y[i]>ytop) {
            cornernum--;
            goto TOP_SIDE;
        }
        yb1 = ytop;
        sy = TOP;
        c1 = XY;
        rightnum = −2;
    }
    else {
        sy = MIDDLE;
        c1 = XX;
    }
    xb1 = xleft;
    sx = LEFT;
    bottomnum = 1;
    topnum = −1;
    goto SECOND_REGION;
```

22. The global variables xb1, yb1, sx, sy, c1, bottomnum, topnum, and rightnum are now declared. The global variable leftnum will also be declared for the code for handling invisible subgroups on the invisible sides of the right, bottom, and top boundary lines.

```
<Global variables 6>+≡
    int sx, sy, c1, bottomnum, topnum, leftnum, rightnum;
    int xb1, yb1;
```

23. The handling of the invisible subgroups on the invisible sides of the right, bottom, and top boundary lines is similar to the above handling of an invisible subgroup on the invisible side of the left boundary line.

```
<After a bottom invisible subgroup 23>≡
    if (i > size) {
        last_side = BOTTOM;
        goto ENDGAME;
    }
    if (x[i − 1] < xleft) {
        if (x[i] < xleft) {
            cornernum--;
            goto LEFT_SIDE;
        }
        xb1 = xleft;
        sx = LEFT;
        c1 = XY;
        topnum = −2;
    }
    else if (x[i − 1] > xright) {
        if (x[i] > xright) {
            cornernum++;
            goto RIGHT_SIDE;
        }
        xb1 = xright;
        sx = RIGHT;
        c1 = XY;
        topnum = 2;
    }
    else {
        sx = MIDDLE;
        c1 = YY;
```

```
            }
    ybl = ybottom;
    sy = BOTTOM;
    leftnum = -1;
    rightnum = 1;
    goto SECOND_REGION;
```

This code is used in section 18.

24. Handling an invisible subgroup on invisible side of the top boundary line.

```
<After a top invisible subgroup 24>≡
    if (i > size) }
        last_side = TOP;
        goto ENDGAME;
    }
    if (x[i - 1] < xleft) {
        if (x[i] < xleft) {
            cornernum++;
            goto LEFT_SIDE;
        }
        xbl = xleft;
        sx = LEFT;
        cl = XY;
        bottomnum = 2;
    }
    else if (x[i - 1] > xright) {
        if (x[i] > xright) {
            cornernum--;
            goto RIGHT_SIDE;
        }
        xbl = xright;
        sx = RIGHT;
        cl = XY;
        bottomnum = -2;
    }
    else {
        cl = YY;
        sx = MIDDLE;
    }
    ybl = ytop;
    sy = TOP;
    leftnum = 1;
    rightnum = -1;
    goto SECOND_REGION;
```

This code is used in section 18.

25. Code for handling an invisible subgroup on the invisible side of the right boundary line.

```
<After a right invisible subgroup 25>≡
    if (i > size) {
        last_side = RIGHT;
        goto ENDGAME;
    }
    if (y[i - 1] < ybottom) {
        if (y[i] < ybottom) {
            cornernum--;
            goto BOTTOM_SIDE;
        }
        ybl = ybottom;
        sy = BOTTOM;
        cl = XY;
        leftnum = -2;
    }
    else if (y[i - 1] > ytop) {
        if (y[i]> ytop) {
            cornernum++;
            goto TOP_SIDE;
        }
        ybl = ytop;
        sy = TOP;
        cl = XY;
```
```
        leftnum = 2;
    }
    else {
        sy = MIDDLE;
        cl = XX;
    }
    xbl = xright;
    sx = RIGHT;
    bottomnum = -1;
    topnum = 1;
    goto SECOND_REGION;
```

This code is used in section 18.

26. Post-processing after a visible group. Similarly, after processing a visible group, a line clipping routine must be used to determine the intersection point the edge connecting the last vertex of the group with the vertex following it. The designated invisible side of the new invisible group must be determined. When the vertex following the last vertex of the visible group has been found to be outside the window, the vertex can be found to be on the invisible side of the left boundary line. It can also be found to be on the invisible side of the right, bottom, or top boundary lines. Let $P_1$ ($x[i-1]$, $y[i-1]$) be the last vertex of the visible group and $P_2$ ($x[i]$, $y[i]$) the vertex immediately following $P_1$.

27. If the vertex following the last vertex of a visible group is found to be on the invisible side of the left boundary line, the first thing is to determine whether the last vertex of the input polygon has been processed. If it has, then remove the last vertex of the output array because the last vertex of the input polygon was appended in the beginning.

```
<(x[i], y[i]) on the left invisible side 27>≡
    if (i > size) {
        *osize = *osize - 1;
        return;
    }
```

See also section 28.
This code is used in section 16.

28. Suppose the vertex after the last vertex of a visible group is on the invisible side of the left boundary line. This piece of information is recorded down in sx2 and xb2. Set c2 to XX. The first endpoint of the edge $P_1$ is in the window. Accordingly, set c1 to WINDOW, sy to MIDDLE, and sx to MIDDLE. Since no window corners are needed to connect intersection points, the variables leftnum, rightnum, bottomnum, and topnum are set to 0.

```
<(x[i], y[i]) on the left invisible side 27>+≡
    cl = WINDOW;
    c2 = XX;
    sy = MIDDLE;
    sx = MIDDLE;
    sx2 = LEFT;
    xb2 = xleft;
    leftnum = rightnum = bottomnum = topnum = 0;
    goto SECOND_Y_REGION;
```

29. Again, the global variables c2, sx2, and xb2 should be declared.

```
<Global variables 6>+≡
    double xb2;
    int c2, sx2;
```

30. If the vertex after the last vertex of a visible group is on the invisible side of the right boundary line, similar actions are performed as if the vertex is on the invisible side of the left boundary line. However, since the sentinel vertex is set to be on the invisible side of the left boundary line, the last vertex of the polygon has not been processed.

```
<(x[i], y[i]) on the right invisible side 30>≡
    c1 = WINDOW;
    c2 = XX;
    xb2 = xright;
    sy = MIDDLE;
    sx = MIDDLE;
    sx2 = RIGHT;
    leftnum = rightnum = bottomnum = topnum = 0;
    goto SECOND_Y_REGION;
```

This code is used in section 16.

31. If the vertex following the last vertex of a visible group is on the invisible side of the bottom boundary line, then the intersection point must be on the bottom boundary line. The intersection point cannot be on either the left or the right boundary lines because the vertex has been checked against these two boundary lines and found to be on the visible sides of them.

Simply compute the intersection point and start processing the first invisible subgroup of the invisible group following the visible group just processed.

```
<Intersection point on the bottom boundary 31>≡
    outp (x[i − 1]+ (x[i − x[i]− 1])*(ybottom − y[i − 1])/
    (y[i] − y[i − 1]), ybottom);
    goto BOTTOM_SIDE;
```

This code is used in section 16.

32. Similarly for a vertex following the last vertex of a visible group that is on the invisible side of the top boundary line.

```
<Intersection point on the top boundary 32>≡
    outp (x[i − 1] + (x[i] − x[i − 1]*(ytop − y[i − 1])/
    (y[i] − y[i − 1]),ytop);
    goto TOP_SIDE;
```

This code is used in section 16.

33. The procedure outp invoked to output an intersection point is a simple procedure. Simply put the intersection point in the arrays ox and oy and increment osize.

```
<Functions 33>≡
    void outp(x,y)
        double x, y;
    {
        *osize++ = *osize + 1;
        ox[*osize] = x;
        oy [*osize] = y;
    }
```

See also section 55.
This code is used in section 2.

34. Line clipping Routine. The line clipping routine used in the present invention has five parts. It first computes the vertical boundary line whose invisible side the second endpoint of the edge is on. Then the horizontal boundary line whose invisible sides the second endpoint is on is computed. Then compute the first intersection point of the edge, if it exists. Then compute the second intersection point, if it exists. Then, jump to the appropriate place to handle the next group. If the first intersection point does not exist, then the next invisible subgroup of the current visible group has been encountered. Jump to the appropriate place to handle it, after updating the number of window corners between the designated invisible side of the previous invisible subgroup and the designated invisible side of the next invisible subgroup.

```
<Handle vertices 16>+≡
    <Second x region 35>
    <Second y region 36>
    <Compute first intersection point 38>
    <Compute second intersection point 45>
    <Go to handle the next group 51>
```

35. The determination of the vertical boundary line whose invisible side the second endpoint is on is not necessary if the first endpoint is in the window because it is known that the second endpoint is either on the invisible side of the left or the right boundary line.

The task is performed by checking the vertical boundary line whose invisible side the first endpoint is on because the two endpoints cannot be on the invisible side of the same vertical boundary line. If the first endpoint is on the invisible side of the left or the right boundary lines, only one comparison is needed to find the invisible side the second endpoint is on. Otherwise, two comparisons are needed.

This task is performed in this implementation by a switch statement using the value of the variable sx. This is not the only implementation possible. A more efficient way uses the value of sx to form the address where the appropriate code resides. In this way, instead of a comparison, a logical shift operation and a logical or operation are used. After the address is formed, simply jump to that address. However, the programming language c does not have the feature to jump to a variable place for its goto statement. This can be done in most assembly languages.

```
<Second x region 35>≡
SECOND_REGION:
    switch (sx) {
        case RIGHT:
            if (x[i] < xleft) {
                xb2 = xleft;
                sx2 = LEFT;
                c2 = XX;
            }
            break;
        case LEFT:
            if (x[i] > xright) {
                xb2 = xright;
                sx2 = RIGHT;
                c2 = XX;
            }
```

```
            break;
    case MIDDLE:
        if (x[i] < xleft) {
            xb2 = xleft;
            sx2 = LEFT;
            c2 = XX;
        }
        else if (x[i] > xright) {
            xb2 = xright;
            c2 = XX;
            sx2 = RIGHT;
        }
        break;
}
```

This code is used in section 34.

36. Similarly, the boundary line whose invisible side the second endpoint is on is determined. Again, forming an address by using the value of sy is probably more efficient than using a switch statement.

```
<Second y region 36>≡
SECOND_Y_REGION:
    switch (sy) {
        case TOP:
            if (y[i] < ybottom) {
                yb2 = ybottom;
                c2 = c2|YY;
                sy2 = BOTTOM;
            }
            break;
        case BOTTOM:
            if (y[i] > ytop) {
                yb2 = ytop;
                c2 = c2|YY;
                sy2 = TOP;
            }
            break;
        case MIDDLE:
            if (y[i] < ybottom) {
                yb2 = ybottom;
                c2 = c2|YY;
                sy2 = BOTTOM;
            }
            else if (y[i]> ytop) {
                yb2 = ytop;
                c2 = c2|YY;
                sy2 = TOP;
            }
            break;
    }
```

This code is used in section 34.

37. The global variables yb2 and sy2 are now declared.

```
<Global variables 6>+≡
    int sy2;
    double yb2;
```

38. The next step in the line clipping routine determines whether there is an intersection point. There is one intersection point if the first endpoint is in the window. Otherwise, jump to the appropriate place to handle the case when the first endpoint is in an edge region of a vertical boundary line, an edge region of a horizontal boundary line, or in a corner region. Again, a switch statement is used when forming address using c1 might be more efficient.

```
<Compute first intersection point 38>≡
    switch (c1) {
        case XX: goto P1_OUTSIDE_X;
        case YY: goto P1_OUTSIDE_Y;
        case XY: goto P1_OUTSIDE_XY;
        case WINDOW: goto P1_INSIDE_WINDOW;
    }
```

See also sections 39, 40, 42, and 44.
This code is used in section 34.

39. If the first endpoint is in the window, nothing has to be done except to prepare for the computation of the second intersection point. The second endpoint cannot be also in the window because it it is, both endpoints will be in the window and this means that the current visible group has not been processed completely.

```
<Compute first intersection point 38>+≡
P1_INSIDE_WINDOW:
    dx = X[i] – x[i – 1];
    dy = y[i] – y[i – 1];
    goto SECOND_ENDPOINT;
```

40. If the first endpoint is in a corner region, then the quotients for the two boundary lines delimiting the corner region the first endpoint is in must be computed and compared. The boundary line with the larger quotient is the boundary line with the first intersection point if the edge intersects the window boundary.

```
<Compute first intersection point 38>+≡
P1_OUTSIDE_XY:
    dx = x[i] – x[i – 1];
    qx = (xb1 – x[i – 1])/dx;
    dy = y[i] – y[i – 1];
    qy = (yb1 – y[i – 1])/dy;
    if (qx > qy) goto P1_OUTSIDE_X_ENTRY_POINT;
    else goto P1_OUTSIDE_Y_ENTRY_POINT;
```

41. The global variables dx, dy, qx, and qy are used to store the differences of the x and y coordinates of the two endpoints and the quotients for the boundary lines in the x and y dimensions respectively.

```
<Global variables 6>+≡
    double dx, dy, qx, qy;
```

42. If the first endpoint is on the invisible side of a vertical boundary line, compute the y-coordinate of the intersection point. The x-coordinate of the intersection point is known and stored in xb1. If the edge does not intersect the window, then the y-coordinate must be above the top or below the bottom boundary lines. Update the number of window corner between the previous intersection point (if it exists) or the first vertex (if the first group is being processed). Go to the appropriate place to handle the next invisible subgroup.

If there is a first intersection point, then it is output. But before it is output, the window corners used to connect the previous intersection point with this just-computed intersection point must be included. This is done by invoking the procedure outc. Then continue processing the edge by going on to check if there is a second intersection point.

```
<Compute first intersection point 38>+=
P1_OUTSIDE_X:
    dx = x[i] - x[i - 1];
    qx = (xb1 - x[i - 1])/dx;
    dy = y[i] - y[i - 1];
P1_OUTSIDE_X_ENTRY_POINT:
    yi1 = y[i - 1] + dy*qx;
    if (yi1 < ybottom) {
        cornernum = cornernum + bottomnum;
        goto BOTTOM_SIDE;
    }
    else if (yi1 > ytop) {
        cornernum = cornernum + topnum;
        goto TOP_SIDE;
    }
    xi1 = xb1;
    ip1 = sx;
    if (sx = LEFT) outc(previous_side, ip1,
    cornernum + leftnum);
    else outc(previous_side, ip1, cornernum + rightnum);
    outp(xi1,yi1);
    goto SECOND_ENDPOINT;
```

43. The global variables used are xi1, and yi1 for storing the coordinates of the first intersection point. The variable ip1 is used to store the boundary line the first intersection point is on. The variable previous_side stores the boundary line the previous intersection point is on.

```
<Global variables 6>+=
    int ip1, previous_side;
    double xi1, yi1;
```

44. It is very similar to handle the first endpoint on the invisible side of a horizontal boundary line.

```
<Compute first intersection point 38>+=
P1_OUTSIDE_Y:
    dy = y[i] - y[i - 1];
    qy = (yb1 - y[i - 1])/dy;
    dx = x[i] - x[i - 1];
P1_OUTSIDE_Y_ENTRY_POINT:
    xi1 = x[i - 1] + dx * qy;
    if (xi1 < xleft) {
        cornernum = cornernum + leftnum;
        goto LEFT_SIDE;
    }
    else if (xi1 > xright) {
        cornernum = cornernum + rightnum;
        goto RIGHT_SIDE,
    }
    yi1 = yb1;
    ip1 = sy;
    if (sy = TOP) outc(previous_side, ip1, cornernum +
    topnum);
    else outc(previous_side, ip1, cornernum + bottomnum);
    outp(xi1,yi1);
    goto SECOND_ENDPOINT;
```

45. The second endpoint can be handled quite similar to the first endpoint, again using a switch statement.

```
<Compute second intersection point 45>=
SECOND_ENDPOINT:
    switch (c2) {
    case WINDOW: goto P2_INSIDE_WINDOW;
    case XX: goto P2_OUTSIDE_X;
    case YY: goto P2_OUTSIDE_Y;
    case XY: goto P2_OUTSIDE_XY;
```

```
    }
```

See also sections 46, 48, 49, and 50.
This code is used in section 34.

46. If the second endpoint is in the window, then go to the dispatch place to jump to process the next visible group after setting up the location of the second intersection point, WINDOW to ip.

```
<Compute second intersection point 45>+=
P2_INSIDE_WINDOW:
    ip = WINDOW;
    goto LAST;
```

47.

```
<Global variables 6>+=
    double xi2, yi2;
    int ip;
```

48. The processing to find the second intersection point on a vertical boundary line is very similar to the computation to find the first intersection point on a vertical boundary line except that the values of dx and dy are known here, and it is known that the edge has at least one intersection point with the window. It is not necessary to check whether line the segment is visible again.

```
<Compute second intersection point 45>+=
P2_OUTSIDE_X:
    qx = (xb2 - x[i - 1])/dx;
P2_OUTSIDE_X_ENTRY_POINT:
    yi2 = y[i - 1] + dy * qx;
    xi2 = xb2;
    ip = sx2;
    outp (xi2,yi2);
    goto LAST;
```

49. It is similar for computing the second intersection point on a horizontal boundary line.

```
<Compute second intersection point 45>+=
P2_OUTSIDE_Y:
    qy = (yb2 - y[i - 1])/dy;
P2_OUTSIDE_Y_ENTRY_POINT:
    xi2 = x[i - 1] + dx * qy;
    yi2 = yb2;
    ip = sy2;
    outp (xi2, yi2);
    goto LAST;
```

50. If the second endpoint is in a corner region, then the quotients of the boundary lines delimiting the corner region the second endpoint is in are computed and compared. This time, the boundary line with the smaller quotient is the boundary line with the second intersection point.

```
<Compute second intersection point 45>+=
P2_OUTSIDE_XY:
```

```
qx = (xb2 − x[i − 1])/dx;
qy = (yb2 − y[i − 1])/dy;
if (qx < qy) goto P2_OUTSIDE_X_ENTRY_POINT;
else goto P2_OUTSIDE_Y− ENTRY− POINT;
```

51. Finally, after computing the intersection points, the next step resets the number of window corners to zero because the first vertex of a visible or invisible group has been encountered. Also, record the boundary line the intersection point is on for use the next time window corners are to be included.

```
<Go to handle the next group 51>≡
LAST:
    cornernum = 0;
    previous_side = ip;
    switch (ip) {
    case MIDDLE: goto IN_WINDOW;
    case LEFT: goto LEFT_SIDE;
    case RIGHT: goto RIGHT_SIDE;
    case BOTTOM: goto BOTTOM_SIDE;
    case TOP: goto TOP_SIDE;
    }
```

This code is used in section 34.

52. Finishing up the main procedure. Before describing how to include window corners between two intersection points, the last part of the main procedure is described. This part processes the first and the last groups together after all vertices have been processed. This is done only if the first vertex is outside the window.

The first step harmonizes the designated invisible sides of the first vertex and the last vertex of the polygon. Since they are the same vertex, if their designated invisible sides are not the same, the designated invisible sides must be modified.

```
<Finishing up 52>≡
ENDGAME:
    if (last_side ≠ original_side) {
        switch (original_side) {
        case TOP:
            if (last_side ≡ LEFT) cornernum--;
            else cornernum++;
            break;
        case RIGHT:
            if (last_side ≡ TOP) cornernum--;
            else cornernum++;
            break;
        case BOTTOM:
            if (last_side ≡ RIGHT) cornernum--;
            else cornernum++;
            break;
        case LEFT:
            if (last_side ≡ BOTTOM) cornernum--;
            else cornernum++;
        }
    }
```

See also section 53.
This code is used in section 7.

53. Then, if there are intersection points computed before the last vertex of the polygon, the window corners between the last intersection point of the polygon and the first intersection point of the polygon am included in the output. The number of window corners between the first vertex and the first intersection point is stored in the variable first_group_corner_number (set when outc was first first invoked after the first group has been processed). This is added to the number of window corners recorded in the last group. The boundary line the first vertex is on is stored in first_intersected_boundary.

If there is no intersection point computed and no visible vertex encountered (when no_visible is TRUE), then the number of window corners between the first vertex and the last vertex of the polygon is in cornernum. If its value is not zero, then the whole window is in the polygon. The variable no_visible must be set to FALSE to reflect the fact that the resultant polygon is visible.

```
<Finishing up 52>+≡
    if (no_visible ≡ FALSE)
        outc(previous_side,first_intersected_boundary,
            cornernum + first_group_corner_number);
    else if (cornernum ≠ 0) {
        no_visible = FALSE;
        outc(previous_side, original_side, cornernum);
    }
```

54.

```
<Global variables 6>+≡
    int first_group_corner_number, first_intersected_boundary;
```

55. Including window corners. If the first group has just been processed, no window corners will be included. The inclusion of the window corners between the first vertex and the first intersection point must wait until the last group has been processed. This is discussed in the section above. Meanwhile, the boundary line the first intersection point is on is stored in the variable first_intersected_boundary. Also, the number of window corners between the first vertex and the first intersection point is stored in first_group_corner_number. The variable no_visible is set to FALSE because an intersection point has just been computed. The boundary line the first intersection point is on is stored in first_intersected_boundary.

If the first group has been processed earlier, to include window corners between the previous intersection point computed and the intersection point just computed, check if the direction is negative or positive. If it is negative, start from the boundary line the previous intersection point is on, include the window corner adjacent to it in the negative direction. Increment the number of corners to be included by one. Continue this process until the number of window corner is zero. If the direction is positive, then start from the window corner in the positive direction adjacent to the boundary line the previous intersection point is on. Include the window corner, and decrement the number of window corners. Continue this until the number of window corners to include is zero.

```
<Functions 33>+≡
    void outc(previous, whichside, h)
            int previous, whichside;
            int h;
    {
        if (no_visible ≡ TRUE) {
            first_group_corner_number = h;
            first_intersected_boundary = whichside;
            no_visible = FALSE;
        }
        else if (h > 0) {
            <Include window corners in the positive
                direction 56>
```

```
        }
        else {
            <Include window corners in the negative
            direction 57>
        }
    }
```

56. The list of window corners in the positive direction is: left bottom, right bottom, right top,

```
<Include window corners in the positive direction 56>≡
    switch (previous) {
    case LEFT: goto POSITIVE_LEFT_BOTTOM;
    case RIGHT: goto POSITIVE_RIGHT_TOP;
    case BOTTOM: goto POSITIVE_RIGHT_BOTTOM;
    case TOP: goto POSITIVE_LEFT_TOP;
    }
POSITIVE_LEFT_BOTTOM:
    outp(xleft, ybottom);
    h--;
    if (h ≦ 0) return;
POSITIVE_RIGHT_BOTTOM:
    outp(xright, ybottom);
    h--;
    if (h ≦ 0) return;
POSITIVE_RIGHT_TOP:
    outp(xright, ytop);
    h--;
    if (h ≦ 0) return;
POSITIVE_LEFT_TOP:
    outp(xleft, ytop);
    h--;
    if (h > 0) goto POSITIVE_LEFT_BOTTOM;
```

This code is used in section 55.

57. The list of window corners in the negative direction is the left top, right top, right bottom, and the right bottom. The cyclic structure of the list is simulated by using goto statements in c.

```
<Include window corners in the negative direction 57>≡
    switch (previous) 1 {
    case LEFT: goto NEGATIVE_LEFT_TOP;
    case RIGHT: goto NEGATIVE_RIGHT_BOTTOM;
    case BOTTOM: goto NEGATIVE_LEFT_BOTTOM;
    case TOP: goto NEGATIVE_RIGHT_TOP;
    }
NEGATIVE_LEFT_TOP:
    outp(xleft, ytop);
    h++;
    if (h ≧ 0) return;
NEGATIVE_RIGHT_TOP:
    outp(xright, ytop);
    h++;
    if (h ≧ 0) return;
NEGATIVE_RIGHT_BOTTOM:
    outp(xright, ybottom);
    h++;
    if (h ≧ 0) return;
NEGATIVE_LEFT_BOTTOM:
    outp(xleft, ybottom);
    h++;
    if (h < 0) goto NEGATIVE_LEFT_TOP;
```

This code is used in section 55.

58. Index.

BOTTOM: −4, 14, 21, 23, 25, 36, 51, 52, 56, 57.
BOTTOM_SIDE: 14, −18, 21, 25, 31, 42, 51.
bottomnum: 21, −22, 24, 25, 28, 30, 42, 44.
clip_polygon: −7, 9.
cornernum: −8, 12, 21, 23, 24, 25, 42, 44, 51, 52, 53.
c1: 21, −22, 23, 24, 25, 28, 30, 38.
c2: 28, −29, 30, 35, 36, 45.
dx: 39, 40, −41, 42, 44, 48, 49, 50.
dy: 39, 40, −41, 42, 44, 48, 49, 50.
ENDGAME: 19, 23, 24, 25, −52.
FALSE: 6, 14, 53, 55.
first_group_corner_number: 53, −54, 55.
first_intersected_boundary: 53, −54, 55.
h: −55.
i: −8.
IN_WINDOW: 14, −16, 51.
iosize: −7, 9.
iox: −7, 9.
ioy: −7, 9.
ip; 46, −47, 48, 49, 51.
ipl: 42, −43, 44.
isize: −7, 9.
ix: −7, 9.
ixleft: −7, 9.
ixright: −7, 9.
iy: −7, 9.
iybottom: −7, 9.
iytop: −7, 9.
LAST: 46, 48, 49, −51.
last_side: 19, −20, 23, 24, 25, 52.
LEFT: −4, 14, 19, 21, 23, 24, 28, 35, 42, 51, 52, 56, 57.
LEFT_SIDE: 14, −17, 23, 24, 44, 51.
leftnum: −22, 23, 24, 25, 28, 30, 42, 44.
loop: 3.
MIDDLE: −4, 21, 23, 24, 25, 28, 30, 35, 36, 51.
NEGATIVE_LEFT_BOTTOM: −57.
NEGATIVE_LEFT_TOP: −57.
NEGATIVE_RIGHT_BOTTOM: −57.
NEGATIVE_RIGHT_TOP: −57.
no_visible: 12, −13, 14, 53, 55.
or: 35.
original_side: 14, −15, 52, 53.
osize: 9, −10, 12, 27, 33.
outc: 42, 44, 53, −55.
outp: 16, 31, 32, −33, 42, 44, 48, 49, 56, 57.
ox: 9, −10, 33.
oy: 9, −10, 33.
POSITIVE_LEFT_BOTTOM: −56.
POSITIVE_LEFT_TOP: −56.
POSITIVE_RIGHT_BOTTOM: −56.
POSITIVE_RIGHT_TOP: −56.
previous: −55, 56, 57.
previous_side: 42, −43, 44, 51, 53.
P1_INSIDE WINDOW: 38, −39.
P1_OUTSIDE_X: 38, −42.
P1_OUTSIDE_X_ENTRY_POINT: 40, −42.
P1_OUTSIDE_XY: 38, −40.
P1_OUTSIDE_Y: 38, −44.
P1_OUTSIDE_Y_ENTRY_POINT: 40, −44.
P2_INSIDE WINDOW: 45, −46.
P2_OUTSIDE_X: 45, −48.
P2_OUTSIDE_X_ENTRY_POINT: −48, 50.
P2_OUTSIDE_XY: 45, −50.
P2_OUTSIDE_Y: 45, −49.
P2_OUTSIDE_Y_ENTRY_POINT: −49, 50.
qx: 40, −41, 42, 48, 50.
qy: 40, −41, 44, 49, 50.
RIGHT: −4, 14, 23, 24, 25, 30, 35, 51, 52, 56, 57.
RIGHT_SIDE: 14, −18, 23, 24, 44, 51.
rightnum: 21, −22, 23, 24, 28, 30, 42, 44.
SECOND_ENDPOINT: 39, 42, 44, −45.
SECOND_REGION: 21, 23, 24, 25, −35.
SECOND_Y_REGION: 28, 30, −36.
SENTINEL: −16, 17, 18,
size: 9, −10, 11, 16, 19, 23, 24, 25, 27.
sx: 21, −22, 23, 24, 25, 28, 30, 35, 42.
sx2: 28, −29, 30, 35, 48.
sy: 21, −22, 23, 24, 25, 28, 30, 36, 44.
sy2: 36, −37, 49.
TOP: −4, 14, 21, 24, 25, 36, 44, 51, 52, 56, 57.
TOP_SIDE: 14, −18, 21, 25, 32, 42, 51.

-continued topnum: 21, —22, 23, 25, 28, 30, 42, 44.
TRUE: 6, 12, 55.
whichside: —55.
WINDOW: —5, 28, 30, 38, 45, 46.
x: —10, —33.
xbl: 21, —22, 23, 24, 25, 40, 42.
xb2: 28, —29, 30, 35, 48, 50.
xi1: 42, —43, 44.
xi2: —47, 48, 49.
xleft: 9, —10, 14, 16, 17, 21, 23, 24, 28, 35, 44, 56, 57.
xright: 9, —10, 14, 16, 18, 23, 24, 25, 30, 35, 44, 56, 57.
XX: —5, 21, 25, 28, 30, 35, 38, 45.
XY: —5, 21, 23, 24, 25, 38, 45.
y: —10, —33.
ybottom: 9, —10, 14, 16, 18, 21, 23, 25, 31, 36, 42, 56, 57.
ybl: 21, —22, 23, 24, 25, 40, 44.
yb2: 36, —37, 49, 50.
yi1: 42, —43, 44.
yi2: —47, 48, 49.
ytop: 9, —10, 14, 16, 18, 21, 24, 25, 32, 36, 42, 56, 57.
YY: —5, 23, 24, 36, 38, 45.

| | |
|---|---|
| ((x[i], y[i]) on the left invisible side 27, 28) | Used in section 16. |
| ((x[i], y[i]) on the right invisible side 30) | Used in section 16. |
| (After a bottom invisible subgroup 23) | Used in section 18. |
| (After a left invisible subgroup 19, 21) | Used in section 17. |
| (After a right invisible subgroup 25) | Used in section 18. |
| (After a top invisible subgroup 24) | Used in section 18. |
| (Compute first intersection point 38, 39, 40, 42, 44) | Used in section 34. |
| (Compute second intersection point 45, 46 48, 49, 50) | Used in section 34. |
| (Finishing up 52, 53) | Used in section 7. |
| (Functions 33, 55) | Used in section 2. |
| (Global variables 6, 10, 13, 15, 20, 22, 29, 37, 41, 43, 47, 54) | Used in section 2. |
| (Go to handle the next group 51) | Used in section 34. |
| (Handle vertices 16, 17, 18, 34) | Used in section 7. |
| (Include window corners in the negative direction 57) | Used in section 55. |
| (Include window corners in the positive direction 56) | Used in section 55. |
| (Initialization for the whole program 9, 11, 12, 14) | Used in section 7. |
| (Intersection point on the bottom boundary 31) | Used in section 16. |
| (Intersection point on the top boundary 32) | Used in section 16. |
| (Local variables in clip_polygon 8) | Used in section 7. |
| (Second x region 35) | Used in section 34. |
| (Second y region 36) | Used in section 34. |
| (The main procedure 7) | Used in section 2. |

What is Claimed as the Invention is:

1. A method of clipping a polygon against a window in a two-dimensional plane in which imaginary boundary lines correspond to window borders, extensions of the imaginary boundary lines divide the two-dimensional plane into regions, sides of the boundary lines on which the window lie are defined as the visible sides, and the other sides of the boundary lines are defined as the invisible sides, said method comprising the steps of:

a. dividing vertices of the polygon into groups of consecutive vertices with respect to the window;

b. identifying each group as a visible group or an invisible group; and c. processing the groups of consecutive vertices together, said visible groups being processed by comparing each vertex with the window borders and clipping the edge of the polygon between consecutive vertices of adjacent groups using a line clipping algorithm, and said invisible groups being processed by initially determining the location of the first vertices in the invisible group and designating that region as the designated invisible side (DIS), comparing the next vertex with the DIS to determine if that vertex is in the DIS and continuing until a vertex is found which is not in the DIS, and clipping the edge of the polygon between consecutive vertices which are in the DIS and not in the DIS respectively to determine whether there are intersection points between the edge and the window boundary.

2. A method of clipping a polygon as claimed in claim 1, wherein the clipping algorithm is a Nicholl-Lee-Nicholl algorithm, modified to use information obtained from steps a. and b. of claim 1.

3. A method of clipping a polygon as claimed in claim 2, further comprising the steps of creating a homing register wherein every time a DIS is changed the homing register is increased by one where the new DIS is the next invisible side counterclockwise to the old DIS, is decreased by one where the new DIS is the next invisible side clockwise and is either increased or decreased by two where the new DIS is opposite to the old DIS, and once the entire invisible group is processed if the homing register is positive all the window points between the previous intersection point and the intersection point following the last vertex of the invisible group in the counterclockwise direction are included, and if the homing register is negative all the window points between the previous intersection point and the intersection point following the last vertex of the invisible group in the clockwise direction are included.

4. A method of clipping a polygon as claimed in claim 1, further comprising the steps of creating a homing register wherein every time a DIS is changed the homing register is increased by one where the new DIS is the next invisible side counterclockwise to the old DIS, is decreased by one where the new DIS is the next invisible side clockwise and is either increased or decreased by two where the new DIS is opposite to the old DIS, and once the entire invisible group is processed if the homing register is positive all the window points between the previous intersection point and the intersection point following the last vertex of the invisible group in the counterclockwise direction are included, and if the homing register is negative all the window points between the previous intersection point and the intersection point following the last vertex of the invisible group in the clockwise direction are included.

5. A method of clipping a polyline against a window in a two-dimensional plane in which imaginary boundary lines correspond to window borders, extensions of the imaginary boundary lines divide the two-dimensional plane into regions, sides of the boundary lines on which the window lie are defined as the visible sides, and the other sides of the boundary lines are defined as the invisible sides, said method comprising the steps of:

a. dividing vertices of the polyline into groups of consecutive vertices with respect to the window, free ends of the polyline being considered as vertices;

b. identifying each group as a visible group or an invisible group; and c. processing the groups of consecutive vertices together, said visible groups being processed by comparing each vertex with the window borders and clipping the edge of the polyline between consecutive vertices of adjacent groups using a line clipping algorithm, and said invisible groups being processed by initially determining the location of the first vertices in the invisible group and designating that region as the designated invisible side (DIS), comparing the next vertex with the DIS to determine if that vertex is in the DIS and continuing until a vertex is found which is not in the DIS, and clipping the edge of the polyline between consecutive vertices which are in the DIS and not in the DIS respectively to determine whether there are intersection points between the edge and the window boundary.

6. A method of clipping a polyline as claimed in claim 5, wherein the clipping algorithm is a Nicholl-Lee-Nicholl algorithm, modified to use information obtained from steps a. and b. of claim 1.

7. A method of clipping a polyline as claimed in claim 6, further comprising the steps of creating a homing register wherein every time a DIS is changed the homing register is increased by one where the new DIS is the next invisible side counterclockwise to the old DIS, is decreased by one where the new DIS is the next invisible side clockwise and is either increased or decreased by two where the new DIS is opposite to the old DIS, and once the entire invisible group is processed if the homing register is positive all the window points between the previous intersection point and the intersection point following the last vertex of the invisible group in the counterclockwise direction are included, and if the homing register is negative all the window points between the previous intersection point and the intersection point following the last vertex of the invisible group in the clockwise direction are included.

8. A method of clipping a polyline as claimed in claim 5, further comprising the steps of creating a homing register wherein every time a DIS is changed the homing register is increased by one where the new DIS is the next invisible side counterclockwise to the old DIS, is decreased by one where the new DIS is the next invisible side clockwise and is either increased or decreased by two where the new DIS is opposite to the old DIS, and once the entire invisible group is processed if the homing register is positive all the window points between the previous intersection point and the intersection point following the last vertex of the invisible group in the counterclockwise direction are included, and if the homing register is negative all the window points between the previous intersection point and the intersection point following the last vertex of the invisible group in the clockwise direction are included.

* * * * *